(12) United States Patent
Kunz

(10) Patent No.: US 8,864,412 B2
(45) Date of Patent: Oct. 21, 2014

(54) METHOD FOR THE REMEDIATION OF CONTAMINATED SOIL

(76) Inventor: Dale Kunz, Calgary (CA)

(*) Notice: Subject to any disclaimer, the term of this patent is extended or adjusted under 35 U.S.C. 154(b) by 0 days.

(21) Appl. No.: 13/347,885

(22) Filed: Jan. 11, 2012

(65) Prior Publication Data

US 2012/0177442 A1 Jul. 12, 2012

Related U.S. Application Data

(60) Provisional application No. 61/431,744, filed on Jan. 11, 2011.

(51) Int. Cl.
*B09C 1/06* (2006.01)
*B09C 1/02* (2006.01)

(52) U.S. Cl.
CPC ............... *B09C 1/025* (2013.01); *B09C 1/062* (2013.01)
USPC .............. 405/128.85; 405/128.1; 405/128.15; 405/128.35; 405/128.45; 405/128.7; 405/128.8; 405/129.45; 405/129.7; 405/129.75

(58) Field of Classification Search
USPC .......... 405/128.1–128.6, 128.7–128.85, 130, 405/129.45, 129.7, 129.75
See application file for complete search history.

(56) References Cited

U.S. PATENT DOCUMENTS

| | | | | |
|---|---|---|---|---|
| 4,849,360 A | * | 7/1989 | Norris et al. | 435/264 |
| 5,228,804 A | * | 7/1993 | Balch | 405/128.85 |
| 5,348,422 A | * | 9/1994 | Manchak et al. | 405/128.35 |
| 6,951,436 B2 | * | 10/2005 | Stegemeier et al. | 405/128.4 |

* cited by examiner

*Primary Examiner* — John Kreck
*Assistant Examiner* — Carib Oquendo
(74) *Attorney, Agent, or Firm* — Marsh Fischmann & Breyfogle LLP; Jonathon A. Szumny

(57) ABSTRACT

A containment chamber is constructed by excavating a pit at the site of oil-contaminated sand and lining the pit with an impermeable, heat-resistant, flexible plastic liner. An array of spaced apart heating assemblies is positioned to cover the bottom of the chamber. Each heating assembly may include an elongate linear electric resistance heater positioned within a tubular slotted sand screen. The containment chamber is filled with a charge of contaminated sand. Solvent, such as diesel fuel, is pumped into the elongate passageways defined between the heaters and screens. The heaters are actuated to vaporize the solvent, which moves through the screen slots and convectively permeates the charge. The vapor transfers heat to the oily sand and condenses. Condensed solvent and heated oil drain and are recovered from the chamber.

3 Claims, 11 Drawing Sheets

METHOD FOR THE REMEDIATION OF CONTAMINATED SOIL

CROSS-REFERENCE TO RELATED APPLICATIONS

This application claims priority from U.S. Provisional Application Ser. No. 61/431,744, entitled "METHOD FOR THE REMEDIATION OF OIL CONTAMINATED SOIL", filed Jan. 11, 2011, the entirety of which is hereby incorporated by reference.

FIELD OF THE INVENTION

The present invention relates to a method for remediating a surface layer of contaminated soil and providing a processing cell in which to carry out the method.

BACKGROUND

In the Gulf War, oil wells were opened and set on fire. Large areas of surrounding sand were covered with unburned crude oil. Salt water was used to assist in extinguishing the fires—it too covered large areas of the surrounding sand. Some of the oil and salt water penetrated downwardly into the porous, permeable, unconsolidated sand to a shallow depth (for example, to a depth of 10 feet). Much of the water evaporated, but the salt remained.

While the oil was initially of low viscosity, its light ends have evaporated over time and the remaining viscous residue is now immobile.

As a consequence, shallow surface layers of sand have been left, contaminated with oil and salt. These layers cover large areas of territory. The land involved has since been barren and useless. Vegetation has difficulty growing on it and the salt is toxic for animals.

The present system has been developed to remediate these contaminated surface layers of sand in such areas (e.g., Kuwait) by recovering the oil and removing the salt. However, it is contemplated that the technique involved may be applied in other circumstances where a porous, permeable surface layer of soil has been contaminated with hydrocarbons, chemicals and the like.

SUMMARY OF THE INVENTION

In one aspect, the invention is concerned with a method for providing a large processing cell to be used to remediate a layer of contaminated soil, such as sand contaminated with a contaminant such as oil or liquid chemical. The method may include:
  excavating contaminated soil from the layer to form a pit at the site of the soil;
  lining the bottom and sides of the pit with an impermeable, heat-resistant, flexible liner to thereby form an open topped containment chamber;
  covering the bottom of the lined chamber with an array of generally parallel, spaced apart, substantially horizontally extending, elongate, linear heating assemblies, each such assembly comprising an electric resistance heater positioned within a tubular soil exclusion screen, the heater and screen combining to define an elongate passageway therebetween in which to heat solvent;
  installing means for supplying electric power to the heaters;
  installing means for removing heated fluid, comprising solvent and contaminant, from the chamber; and
  installing means for supplying solvent into the passageways, so that the solvent may be used to heat and mobilize the contaminant.

By providing the processing cell in this way, the following advantages are achieved:
  a very large cell, capable of processing a large volume of feedstock in one charge, is created; and
  the cell is located immediately adjacent the feedstock, thereby minimizing transportation cost.

In a further aspect of the invention, the processing cell is used in the following manner. The process is described in connection with sand contaminated with oil, by way of example:
  the empty containment chamber is filled with a layer of sand contaminated with oil—the contaminated sand supplied may have been excavated to form the cell itself and windrowed beside it, or may have been excavated from an adjacent area;
  optionally, a cover or tarp may be spread over the filled chamber, to minimize the escape of solvent vapor;
  a solvent, which is miscible with the contaminant (such as diesel fuel in the case of oil), is then fed into the heating passageways and the heaters are activated to vaporize the solvent;
  the solvent vapor exits through the screen openings and permeates upwardly through the sand, thereby convectively heating the sand layer, condensing and diluting heated oil contained in the sand, which oil is thereby mobilized;
  the mobilized oil and condensed solvent drain down through the layer and part thereof may re-enter the passageways, whereby contained solvent is re-vaporized; another portion of the draining fluid collects at the base of the layer and forms an upwardly growing body of such fluid;
  in due course, the fluid removal means is activated to pump the drained fluid to storage means and leave a residue of cleaned sand in the cell; and
  the cleaned sand residue is then removed from the cell and may be deposited in an adjoining pit.

It will be noted that, as a consequence of vaporizing the solvent using solvent delivery means substantially covering the areal extent of the chamber, heat is expeditiously distributed and transferred throughout the layer.

In an optional feature of the invention, the cell is used repeatedly to process charges of contaminated soil excavated from adjacent areas.

Preferably the liner and heating assemblies are removable to enable re-use in another pit.

In another optional feature, once a body of drained oil and solvent fluid has accumulated, water and surfactant are mixed together and the mixture is pumped through the passageways and rises up into the layer of sand. In this way, the body of drained fluid is displaced, solvent still adhering to the sand is recovered and salt present in the sand is solubilized. The displaced fluid, recovered solvent and salty water are removed from the cell, using means such as a weir and pump box.

DESCRIPTION OF THE PREFERRED EMBODIMENT

The method will be described in connection with remediating a surface layer 1 of oil-contaminated sand 2, such as exists in Kuwait. The sand 2 is unconsolidated, porous and permeable. It typically comprises 34 wt. % oil, 64 wt. % sand and 1 or 2 wt. % salt. The contamination commonly extends down from ground surface 3 to a depth of about 10 feet.

Figure 1:
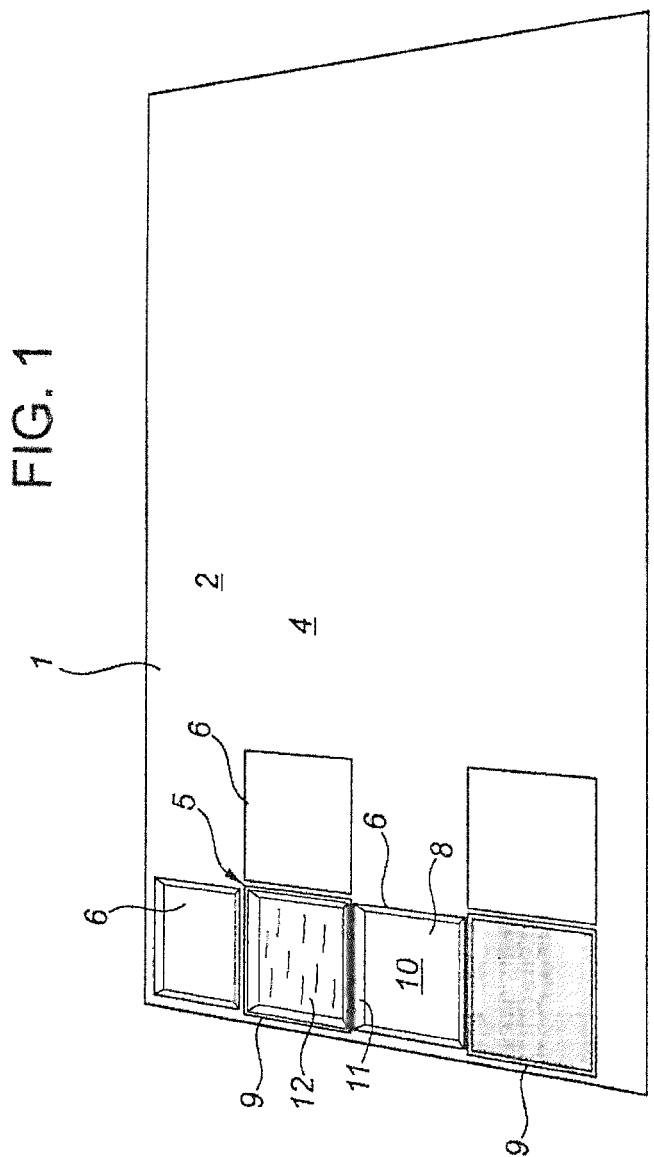
FIG. 1 is a perspective view showing an excavated pit, an empty processing cell and a filled processing cell.

As shown in FIG. 1, a tract 4 is sub-divided into a central area 5 and surrounding adjacent areas 6. The areas 5, 6 may be rectangular in configuration and substantially contiguous. For instance, each area may be about 200 meters in length and 50 meters in width.

The width may be selected so that excavators 7 (see FIG. 3), positioned on each side edge of a pit area, can extend their buckets to about the centerline of the pit to be excavated.

Figure 2:
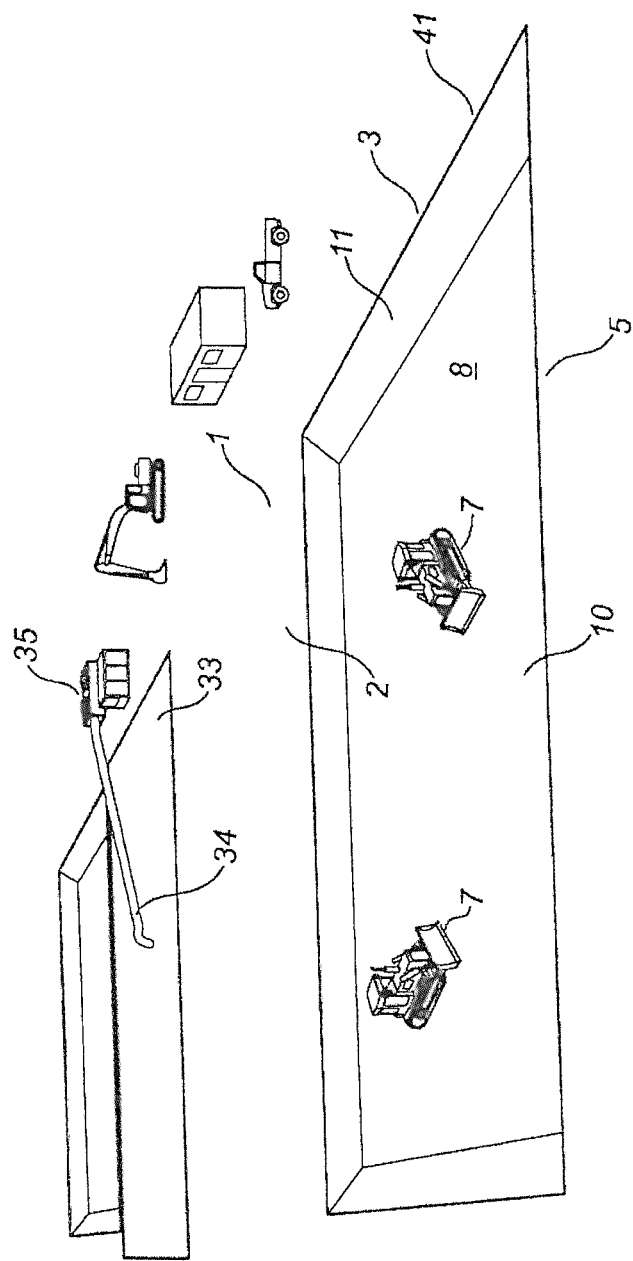
FIG. 2 is a perspective view showing an operational processing cell and a new pit being excavated to be used as a processing cell or to supply feedstock for cleaning.

As shown in FIG. 2, in a first step of the process, machines 7, such as excavators, bulldozers, loaders and trucks, are used to excavate the oil-contaminated sand 2 from the central area 5 and thereby create a pit 8. The excavated sand is conveyed to an adjacent area 6 and stored thereon.

Figure 3:
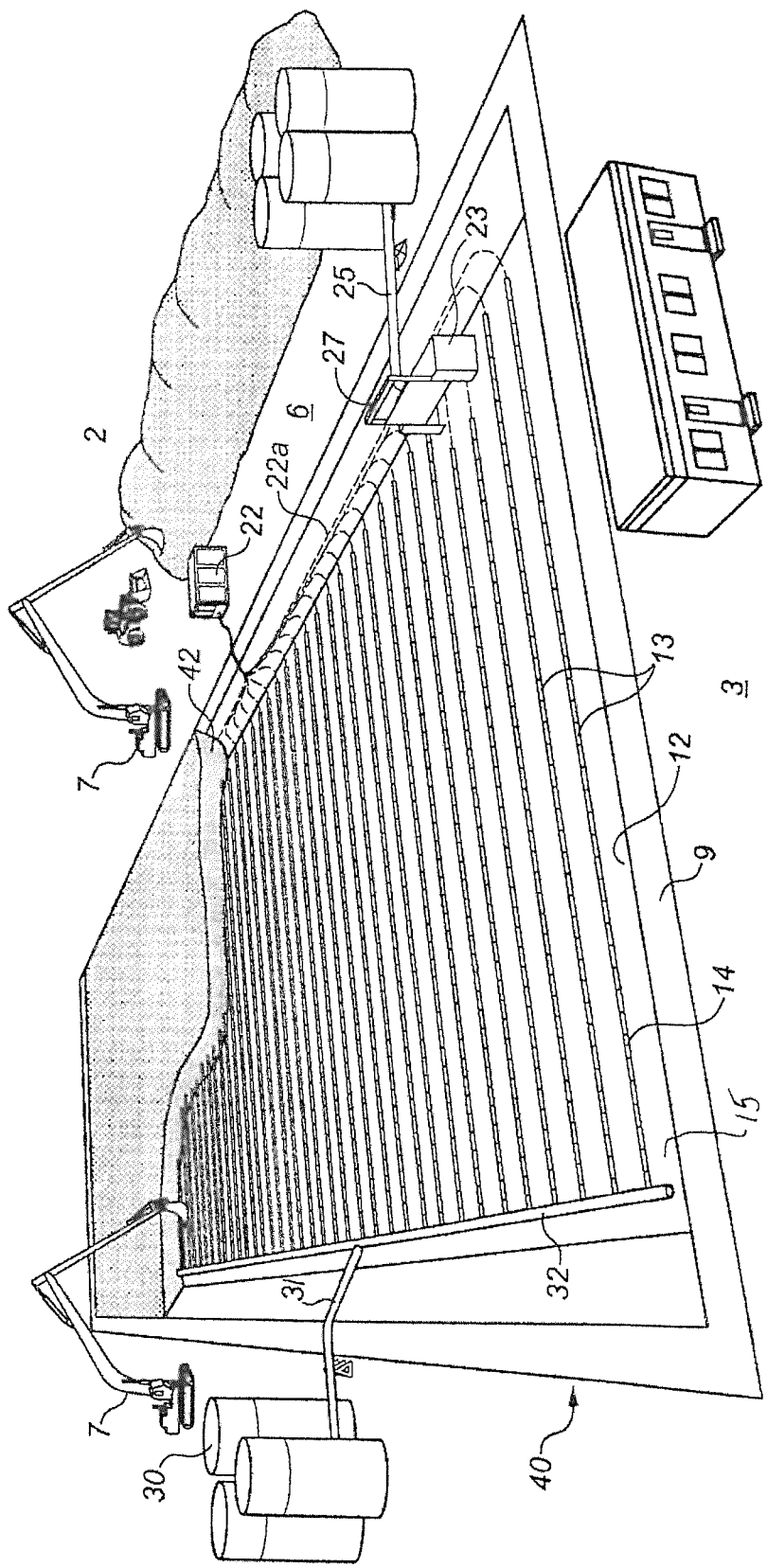
FIG. 3 is a perspective view showing a processing cell having the liner and heater assemblies installed and contaminated sand from an adjacent area being filled into the cell.
Figure 4:
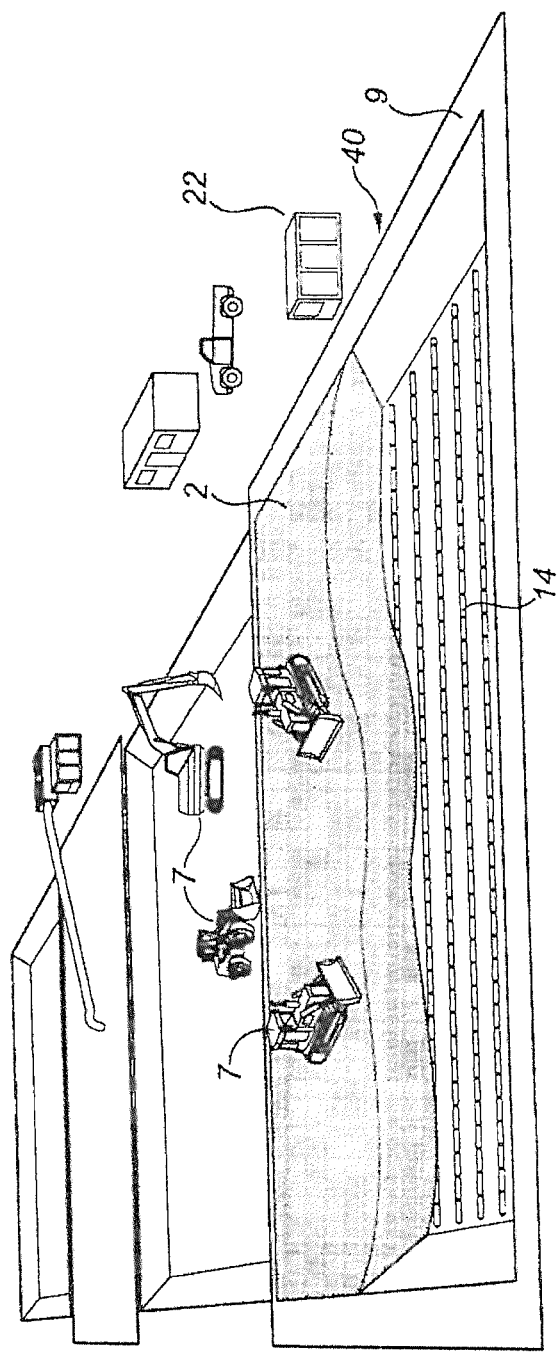
FIG. 4 is a perspective view showing a processing cell being filled with contaminated sand from an adjoining area—an operating processing cell is shown in the background.

As shown in FIGS. 3 and 4, a high temperature-resistant, impermeable, flexible liner 9 is spread over the bottom and side surfaces 10, 11 (surfaces 10, 11 being shown in FIG. 2) of the pit 8, thereby forming an open containment chamber 12.

The liner 9 functions to contain added and produced liquids within the chamber 12. The liner 9 suitably may be formed by doubling a sheet of synthetic silicone-coated fiber glass, typically weighing 32 ounces per square yard—such material is available from Hi-Temp Products of Canada Inc. in Edmonton, Alberta, under product number R51. The material can withstand exposure to temperatures of at least 300° C.

As shown in FIG. 3, an array 13 of parallel, spaced apart, substantially horizontally extending, elongate heating assemblies 14 are installed to substantially cover the bottom 15 of the containment chamber 12. The heating assemblies 14 may be spaced apart by, for example, about 1 meter. A protective layer 52 of clean sand may be deposited over the heating assemblies 14, as shown in FIG. 5.

Figure 5:
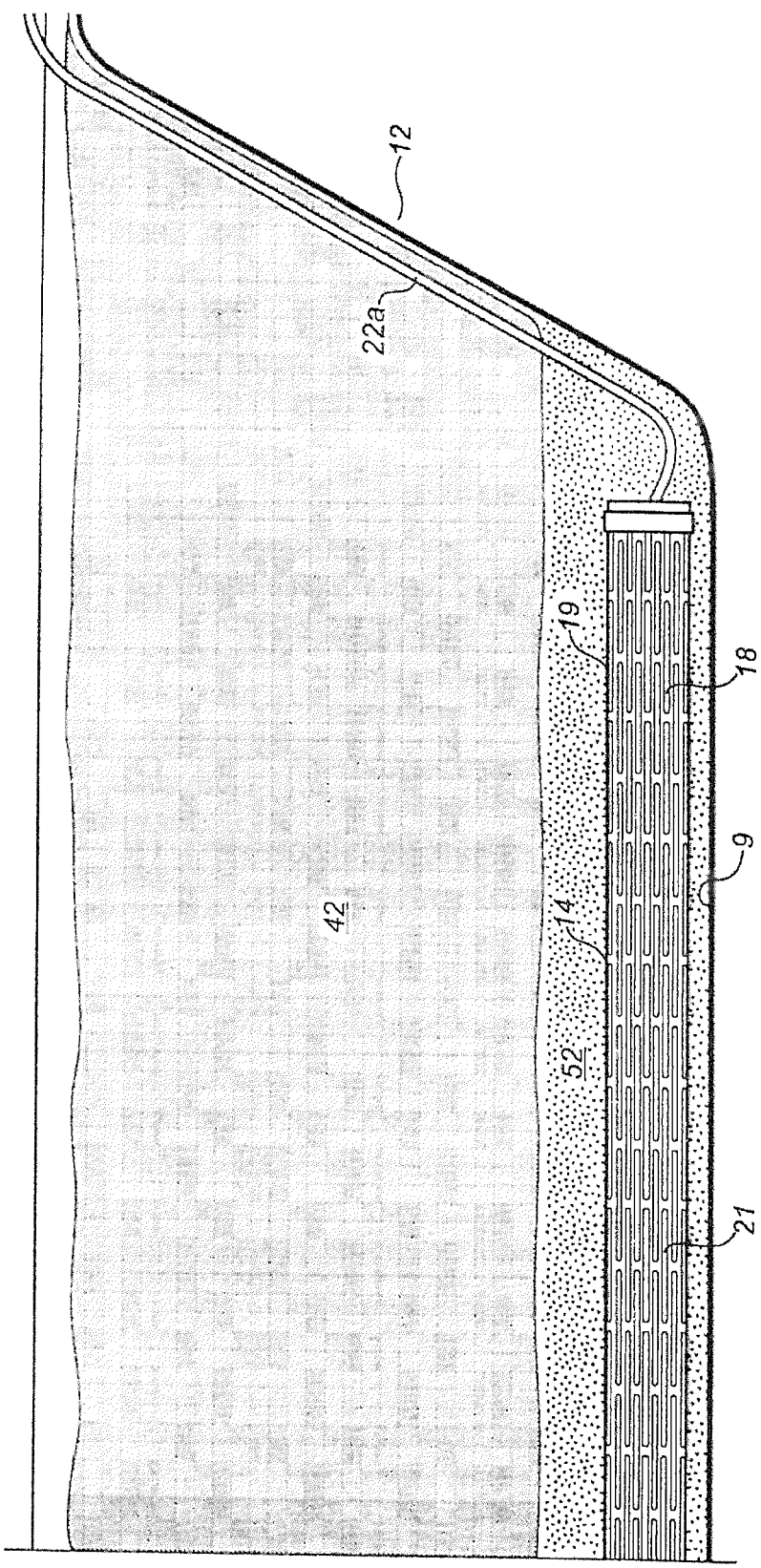
FIG. 5 is a sectional side view showing part of a heater assembly installed in a processing cell.
Figure 5A:
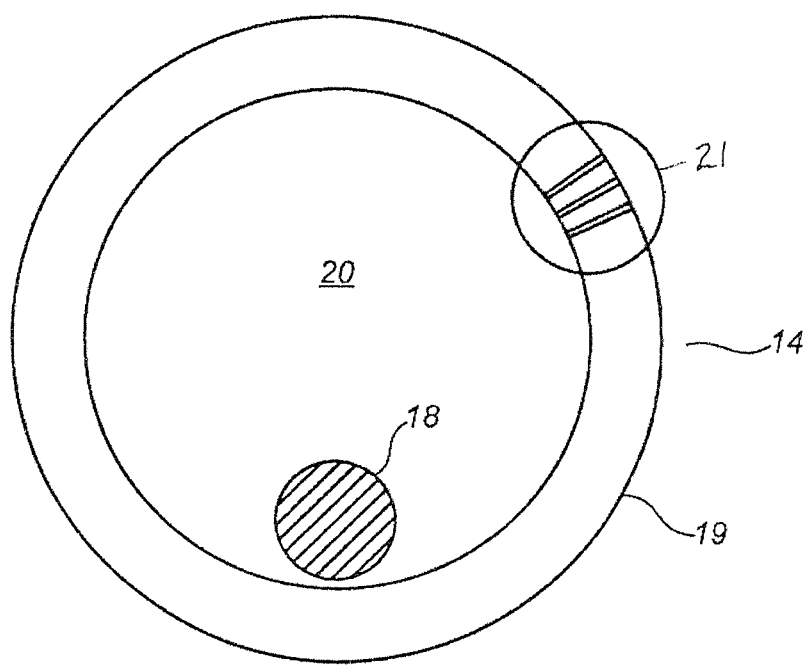
FIG. 5a is an end sectional view of the heater assembly and processing cell of FIG. 5.

Turning to FIGS. 5 and 5a, each heating assembly 14 includes a linear electric resistance heater 18 positioned within a tubular sand exclusion screen 19. A suitable heater 18 is available from Watlow Electric Manufacturing Company, St. Louis, Mo. under model name WATROD™.

A suitable slotted sand exclusion screen 19 is available from Baker Hughes and is referred to as 'API slotted horizontal well liner'. A typical screen unit is 33 feet in length. Units are threaded together end to end to achieve the desired length.

The screen 19 may have an internal diameter of 4 inches and the heater 18 may have an external diameter of $\frac{3}{4}$ inches. Having reference to FIG. 5a, an elongate passageway, referred to as a heating chamber 20, is defined between the heater 18 and screen 19. Each screen 19 may be slotted to form openings 21 having a width of about $\frac{16}{1000}$ of an inch. The openings 21 are dimensioned so as to exclude the sand.

Turning to FIG. 3, means, such as a generator assembly 22, may be operatively coupled by lines 22a to the heaters 18, for the controlled supply of electric power thereto.

Figure 10:
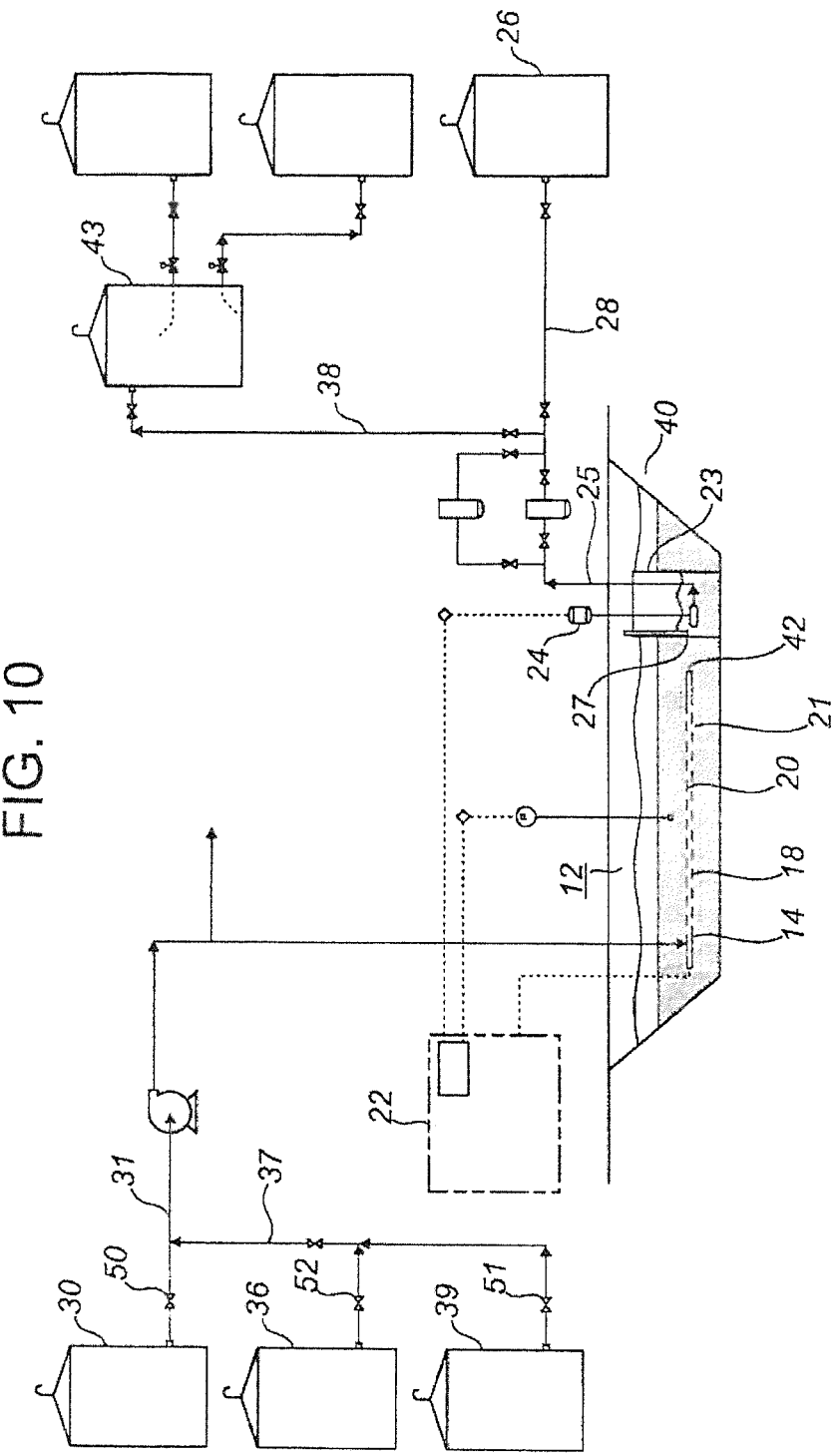
FIG. 10 is a schematic diagram showing a processing cell and its associated equipment.

Having reference to FIGS. 3 and 10, a source of solvent for the contaminant is provided. A tank 30, containing solvent, may be connected by line 31 with a header 32 connected to the heating chambers 20. A valve 50 controls the supply of solvent to the heating chambers 20.

A suitable solvent for the contaminant oil is diesel fuel. It boils and vaporizes at about 160° F. Thermocouples (not shown) may be distributed along the heating assemblies 14 to monitor temperature therealong. Information from the thermocouples, transmitted to a controller (not shown) for the generator assembly 22, can serve to assist in controlling the supply of power to the heaters 18 to stabilize the temperature within the heating chambers 20 at boiling level.

As shown in FIG. 3, a pump box 23, containing a submersible pump 24 (see FIG. 10), may be positioned within the containment chamber 12. The pump 24 may be connected by line 25 and/or 28 to a storage tank 26. A slide gate or weir 27 controls entry of fluid into the pump box 23. This assembly, or a suitable alternative, provides a controlled means for removing heated fluid from the chamber 12.

Figure 7:
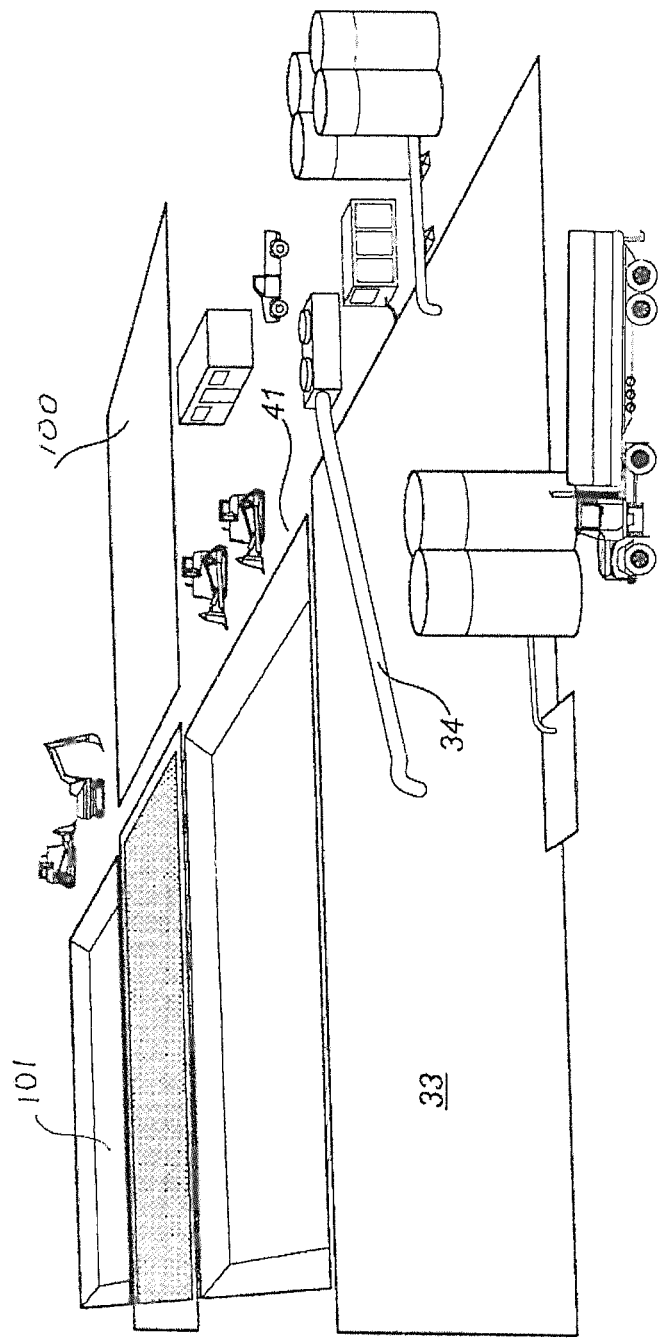
FIG. 7 is a perspective view showing a cell containing cleaned sand ready for removal so that the liner and processing equipment may be recovered.
Figure 8:
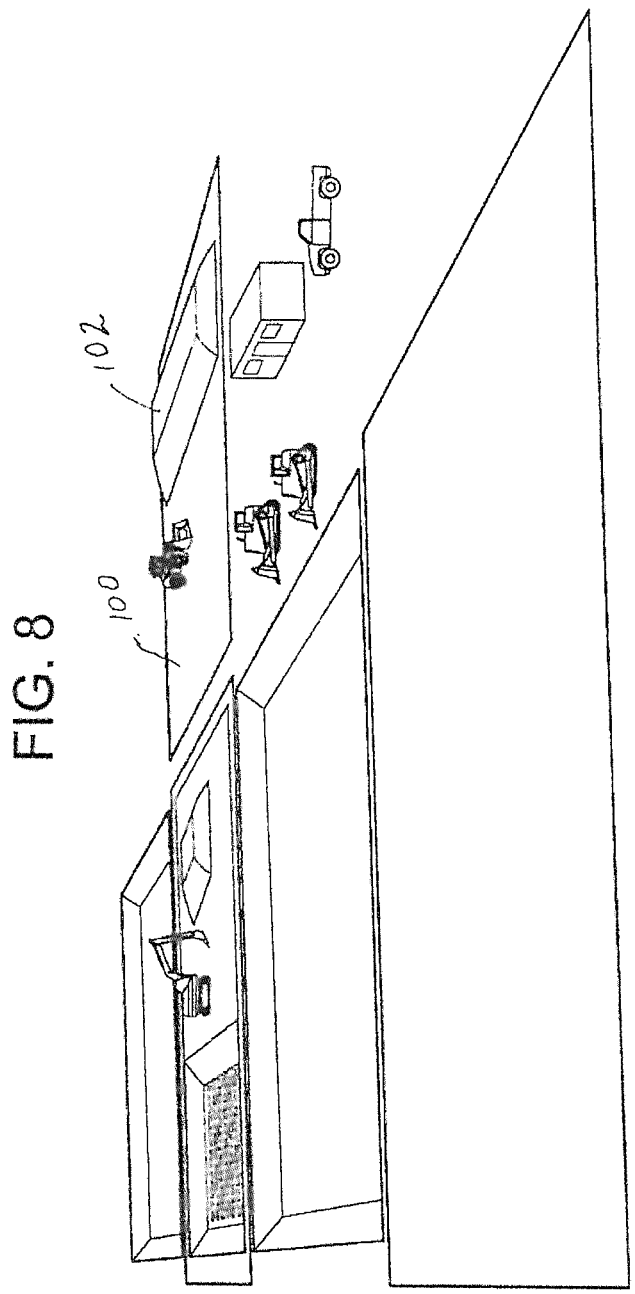
FIG. 8 is a perspective view showing cleaned sand being removed from a containment chamber and being stored on an adjacent area.
Figure 9:
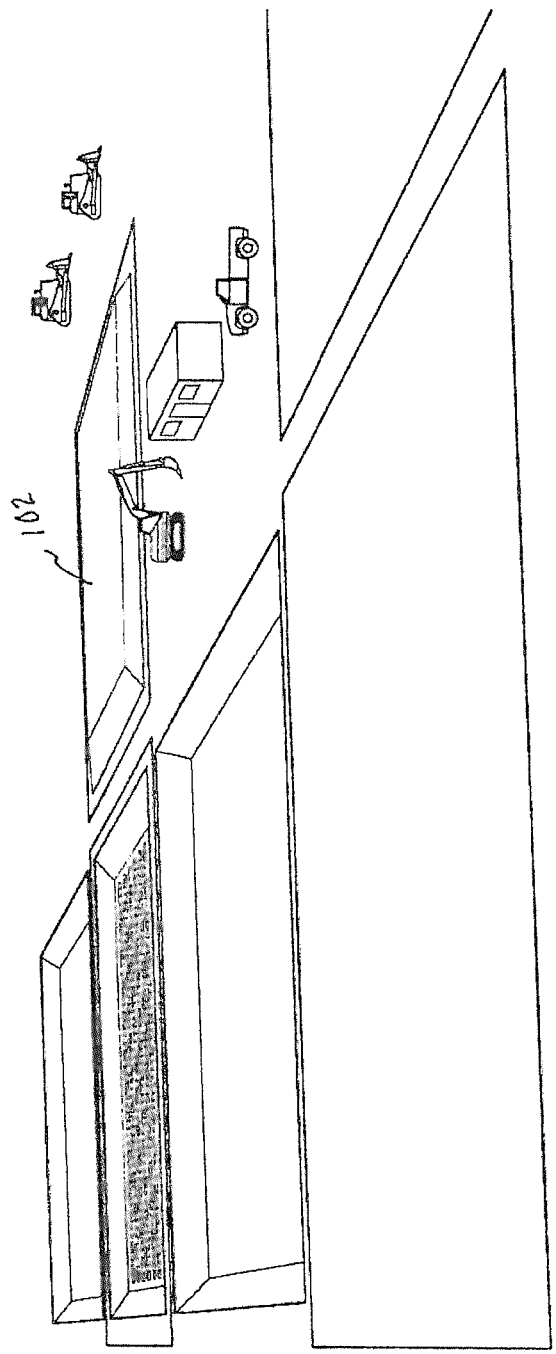
FIG. 9 is a perspective view showing cleaned sand having been removed from a containment chamber onto an adjacent area.

As shown in FIGS. 2 and 7, a tarp or cover assembly 33, connected by a duct 34 with a suction fan 35, may be provided to contain or remove solvent vapor, if desired.

Turning to FIG. 10, a pair of tanks 36, 39, containing water and a surfactant, such as trisodium phosphate, may be positioned beside the chamber 12 for a purpose described below. The water tank 36 may be controlled by valve 52 and connected by a line 37 with the line 31 and/or header 32. The surfactant tank 39 may be controlled by valve 51 and connected with line 37.

In summary then, a processing cell 40 is provided for recovering a contaminant (such as oil) from a porous permeable charge of soil (such as sand). The cell 40 may include:
  an excavated pit located at the site of the contaminated soil;
  an impermeable, heat-resistant, removable, flexible liner lining the bottom and sides of the pit to form an open-topped containment chamber, the liner material being selected to withstand the temperature needed to vaporize a selected solvent to be used in the cell;
  an array of generally parallel, spaced apart, substantially horizontally extending, elongate, linear heating assemblies substantially covering the bottom of the chamber, each heating assembly including an electric resistance heater positioned within a tubular perforated soil exclusion screen, each heater and screen combining to define an elongate heating chamber therebetween;
  controllable means for supplying electric power to the heaters;

controllable means for removing heated fluid from the containment chamber;

controllable means for supplying solvent for the contaminant to the heating chambers; and optionally controllable means for supplying water to the heating chambers.

As shown in FIG. 3, with the processing cell 40 ready for operation, the machines 7 excavate contaminated sand 2 from an adjacent area 6, thereby forming a secondary pit 41 (see FIG. 2). The excavated contaminated sand is placed in the containment chamber 12 to provide a charge 42 for processing.

Figure 6:
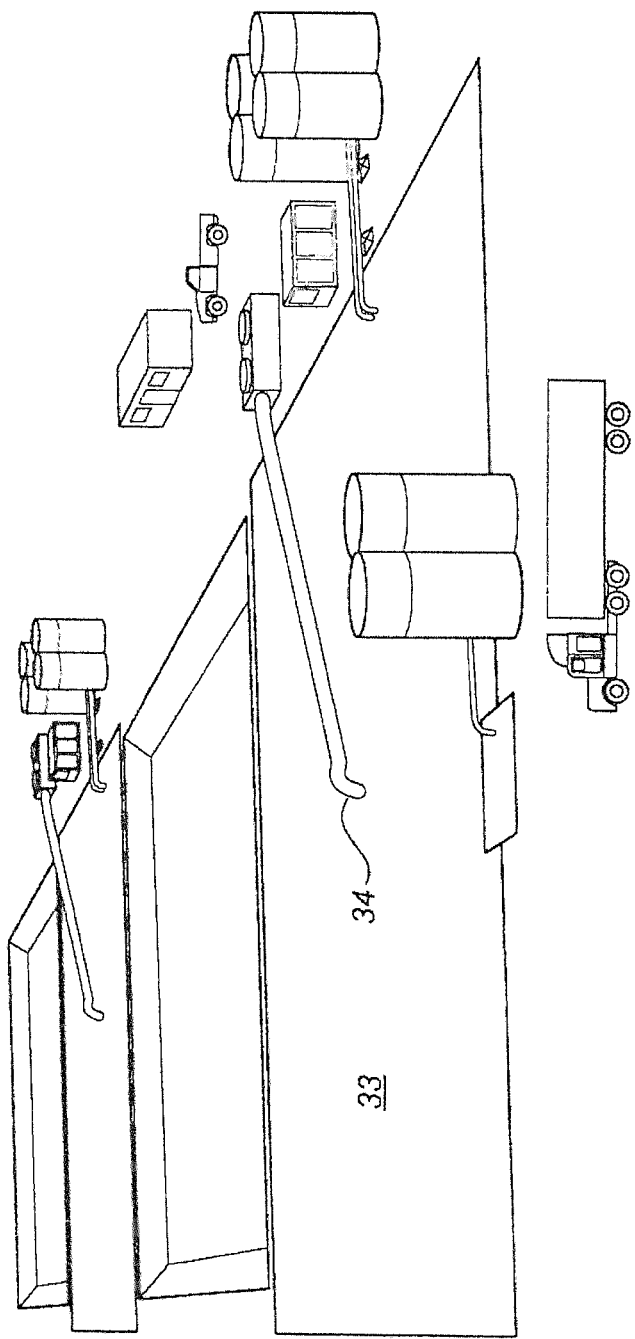
FIG. 6 is a perspective view showing two spaced apart processing cells operating at the same time on contaminated sand excavated from adjoining pits.

As shown in FIG. 6, the cover assembly 33 is stretched over the containment chamber 12 when the latter has been filled.

One operation will now be described in connection with a charge of oily sand further contaminated with salt:

Turning to FIGS. 3-10, solvent, such as diesel fuel, is pumped from solvent tank 30 through line 31 and header 32 into the heating chambers 20. The heaters 18 are actuated to vaporize solvent in the heating chambers 20. The hot solvent vapor ascends through the screen openings 21 and convectively permeates through the charge 42. The vapor transfers heat to the oily sand and condenses. The condensed solvent solubilizes some of the heated oil. A fluid, comprising oil and solvent, drains under the impetus of gravity toward the bottom of the containment chamber 12. Some of this fluid will enter the heating chambers 20 with the result that contained solvent will again vaporize and rise into the charge 42; some of the draining fluid will commence to establish an upwardly growing body of liquid oil and solvent at the base of the containment chamber 12. The foregoing process is continued until it is assumed that the charge has been adequately cleaned. At this point, the solvent line 31 is closed and a mixture of water and surfactant is pumped from water tank 36 and surfactant tank 39 through line 37 and header 32 into the heating chambers 20. The supply of power to the heaters 18 is discontinued. The water/surfactant mixture displaces the body of oil/solvent over the weir 27 and into the pump box 23. The submersible pump 24 is actuated to deliver the oil/solvent to oil storage tank 26 through line 28. The charge 42 is washed with the water/surfactant mixture until the salt has been substantially solubilized and delivered through the pump box 23 and line 38 to water storage tank 43. Cleaned sand 102 may then be removed from the chamber 12 and stored on ground sheet 100 for eventual placement in an empty pit 101.

The foregoing description has been presented for purposes of illustration and description. Furthermore, the description is not intended to limit the invention to the form disclosed herein. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed:

1. A method for remediating a surface layer of permeable porous contaminated soil containing a contaminant, comprising:

excavating contaminated soil from the layer to form a pit having bottom and side surfaces;

lining the bottom and side surfaces of the pit with an impermeable, heat-resistant, flexible liner to form an open topped containment chamber;

substantially covering the bottom of the containment chamber with an array of generally parallel, spaced apart, substantially horizontally extending, elongate heating assemblies, each assembly comprising an electric resistance heater positioned within a tubular perforated screen operative to exclude soil, the heater and screen combining to define an elongate horizontal passageway therebetween;

installing means for supplying electric power to the heaters;

installing means for supplying solvent, for the contaminant, to the elongate passageways;

installing means for removing heated liquid from the containment chamber;

filling the containment chamber with contaminated soil from an adjacent area to provide a charge for processing;

pumping solvent for the contaminant into the elongate horizontal passageways;

operating the heaters to vaporize solvent present in the elongate horizontal passageways, thereby producing hot solvent vapour that rises, through the screens, convectively heats the charge, condenses and combines with the contaminant to form a mobile heated liquid that drains downwardly; and recovering drained heated liquid from the containment chamber using the removal means.

2. The method as set forth in claim 1, wherein the soil is sand and the contaminant is oil.

3. The method as set forth in claim 2, wherein the removal means comprises a pump box positioned in the containment chamber and having means for controlling the entry of fluid into the box for removal and a pump for removing fluid from the box, and further comprising:

pumping water through the screens to displace drained heated fluid into the box.

* * * * *